US012640844B2

(12) United States Patent
Yankilevich et al.

(10) Patent No.: US 12,640,844 B2
(45) Date of Patent: May 26, 2026

(54) SYSTEM AND METHOD FOR ERROR-DETECTING CODE-BASED PACKET TRANSMISSION ACKNOWLEDGEMENT

(71) Applicant: Microsoft Technology Licensing, LLC, Redmond, WA (US)

(72) Inventors: Yevgeny Yankilevich, Tirat Carmel (IL); Assaf Shacham, Zichron Yaakov (IL); Konstantin Taranov, Zurich (CH); Mahmoud S. Elhaddad, Newcastle, WA (US); Dongwook Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/759,620

(22) Filed: Jun. 28, 2024

(65) Prior Publication Data

US 2026/0005794 A1     Jan. 1, 2026

(51) Int. Cl.
H04L 1/00          (2006.01)
H04L 1/1607        (2023.01)

(52) U.S. Cl.
CPC .......... H04L 1/0061 (2013.01); H04L 1/1628 (2013.01)

(58) Field of Classification Search
CPC ... H04L 1/0041; H04L 1/0045; H04L 1/0055; H04L 1/0057; H04L 1/0061; H04L 1/1614; H04L 1/1628
See application file for complete search history.

(56) References Cited

U.S. PATENT DOCUMENTS

| | | | | |
|---|---|---|---|---|
| 2008/0259891 | A1* | 10/2008 | Dent ..................... | H04L 1/1614 |
| | | | | 375/221 |
| 2009/0213728 | A1* | 8/2009 | Chang ................... | H04L 1/0057 |
| | | | | 370/216 |
| 2014/0372840 | A1* | 12/2014 | Barthel ................. | H04L 1/0061 |
| | | | | 714/807 |
| 2022/0131553 | A1 | 4/2022 | Huang et al. | |
| 2022/0294557 | A1* | 9/2022 | Gopalan ............... | H04L 1/0061 |
| 2026/0005941 | A1 | 1/2026 | Yankilevich et al. | |

OTHER PUBLICATIONS

Extended European Search Report received for EP Application No. 25185171.3, mailed on Nov. 27, 2025, 10 pages.

* cited by examiner

*Primary Examiner* — Shelly A Chase

(57)          ABSTRACT

A method, computer program product, and computing system for processing a plurality of packets transmitted from a first computing device to a second computing device. A packet sequence number associated with each packet is identified. An error-detecting code representation is generated using the packet sequence number of each packet. The error-detecting code representation is compared with an error-detecting code representation generated from a sequence of expected packet sequence numbers associated with transmission of a plurality of expected packets. A notification indicating that a packet is missing from the plurality of expected packets is generated when the error-detecting code representation is not equal to the error-detecting code representation generated from the sequence of expected packet sequence numbers.

20 Claims, 6 Drawing Sheets

<u>10</u>

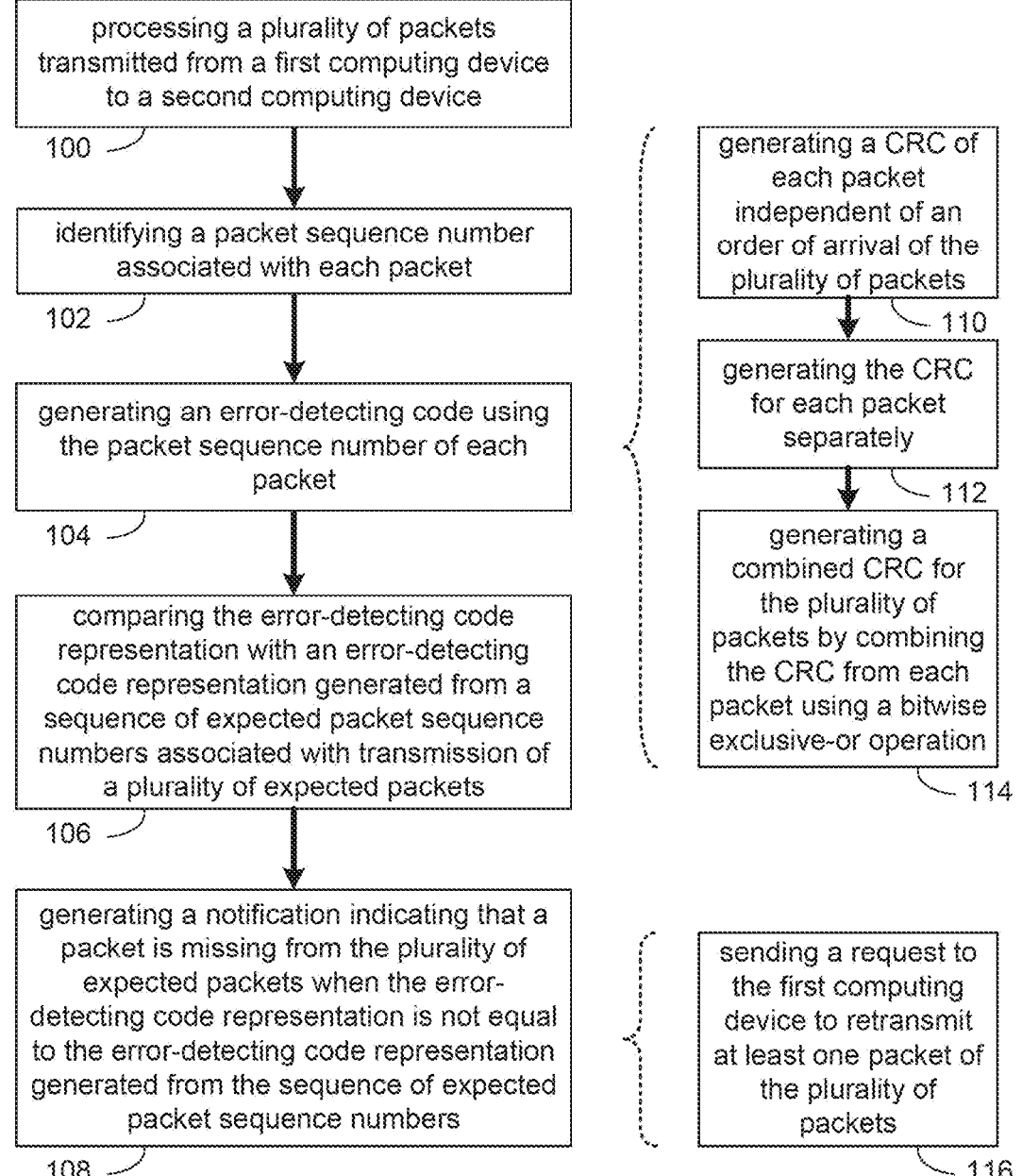

processing a plurality of packets transmitted from a first computing device to a second computing device

100 identifying a packet sequence number associated with each packet

102 generating an error-detecting code using the packet sequence number of each packet

104 comparing the error-detecting code representation with an error-detecting code representation generated from a sequence of expected packet sequence numbers associated with transmission of a plurality of expected packets

106 generating a notification indicating that a packet is missing from the plurality of expected packets when the error-detecting code representation is not equal to the error-detecting code representation generated from the sequence of expected packet sequence numbers

108 generating a CRC of each packet independent of an order of arrival of the plurality of packets

110 generating the CRC for each packet separately

112 generating a combined CRC for the plurality of packets by combining the CRC from each packet using a bitwise exclusive-or operation

114 sending a request to the first computing device to retransmit at least one packet of the plurality of packets

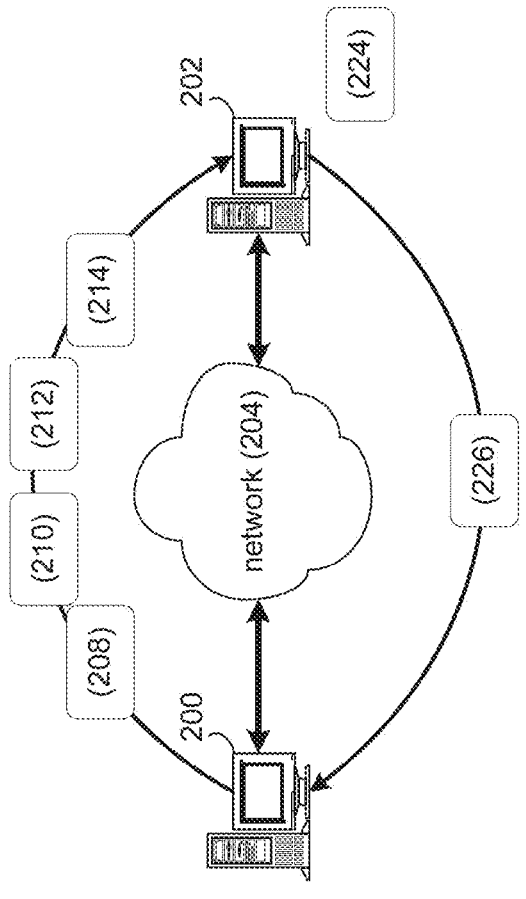
FIG. 2
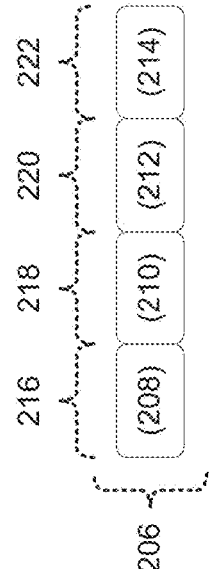

SYSTEM AND METHOD FOR ERROR-DETECTING CODE-BASED PACKET TRANSMISSION ACKNOWLEDGEMENT

BACKGROUND

The efficient transmission of packets or portions of data between computing devices is cornerstone of modern communication systems, encompassing diverse domains such as telecommunications, data networking, Internet protocols, etc. Packet transmission protocols and systems enable the efficient transfer of data across diverse network architectures. Packets traverse complex network topologies, encountering various challenges such as latency, packet loss, and congestion. Conventional protocols provide for the acknowledgement of receipt of the packets and the opportunity to identify missing or corrupted packets of data through various processes that identify and seek retransmission of packets lost during transmission. However, these approaches generally require the retransmission of too many packets that may be lost, or are computationally expensive and slow, thus increasing network latency between the source and destination computing devices.

BRIEF DESCRIPTION OF THE DRAWINGS

FIG. 1 is a flow chart of an implementation of a packet transmission acknowledgment process;

FIG. 2 is a diagrammatic view of the transmission of a message from one computing device to another according to an implementation of the packet transmission acknowledgment process of FIG. 1;

DETAILED DESCRIPTION OF THE EMBODIMENTS

Figure 3:
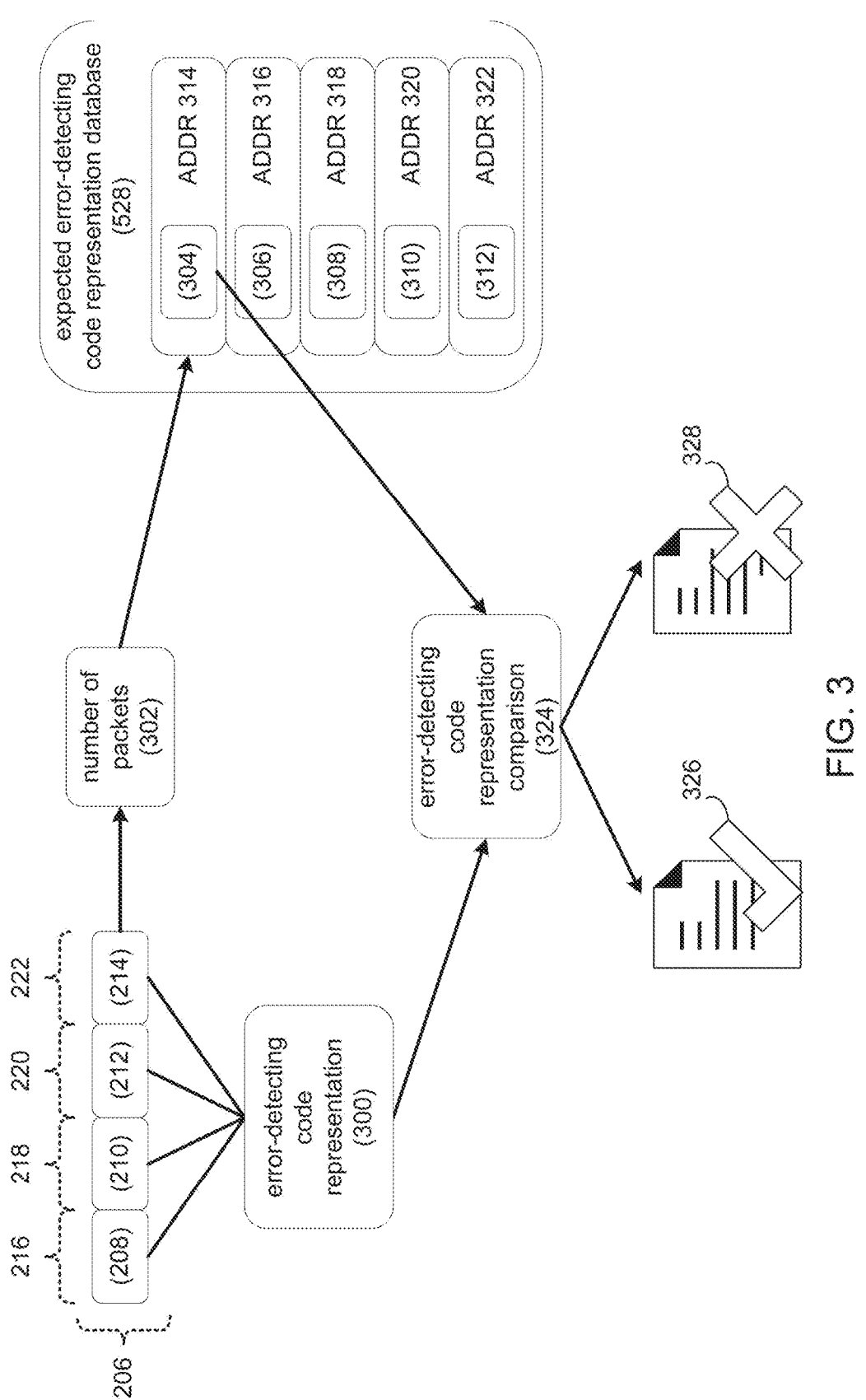
FIG. 3 is a diagrammatic view of the generating of an error-detecting code representation of a message when compared to an expected error-detecting code representation of the packets according to an implementation of the packet transmission acknowledgment process of FIG. 1.
Figure 4:
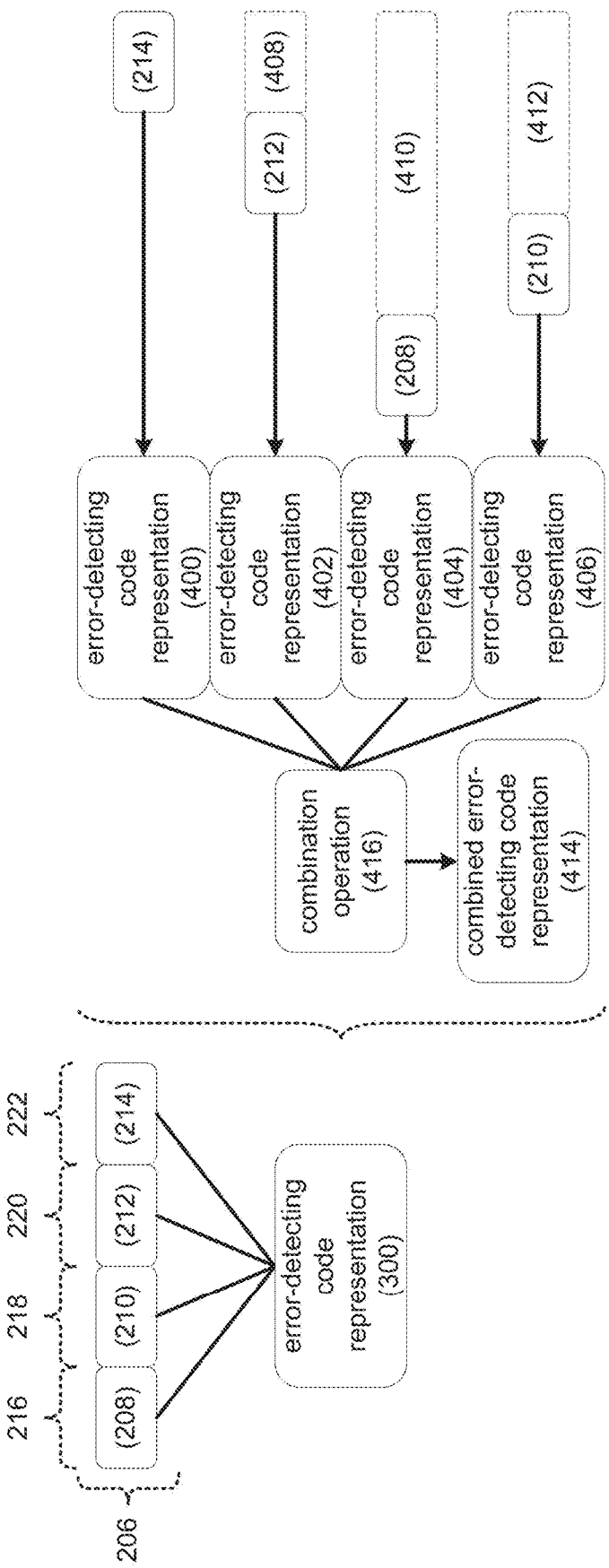
FIG. 4 is a diagrammatic view of an expected error-detecting code representation database generated according to an implementation of the packet transmission acknowledgment process of FIG. 1.

Implementations of the present disclosure allow for packets communicated between computing devices to be tracked using packet sequence numbers within a "message" (i.e., a plurality of packets) by generating an error-detecting code representation of the received sequence and comparing this error-detecting code representation with an expected error-detecting code representation of the message. For example, in the context of packet transmission, packet loss occurs in computer networks when data packets traveling from one point to another fail to reach their destination.

This can happen due to various reasons: congestion (i.e., when network traffic between computing devices is heavy, routers and switches may become overwhelmed, causing them to drop packets); faulty hardware or connections (i.e., malfunctioning network equipment or damaged cables can result in packet loss); software errors (i.e., bugs or misconfigurations in network devices or applications can cause packets to be dropped); and wireless interference (i.e., in wireless networks, interference from other devices or environmental factors can lead to packet loss). Conventional approaches to managing packet loss include, for example, the "Go-Back-N" (GBN) retransmission protocol that maintains a window of packets that have been sent but not yet acknowledged. The sending computing device continues to send packets within the window until it reaches a maximum window size, at which point it waits for acknowledgements before sending additional packets. In environments where the packet loss rate is not low enough and the round-trip time for send packets is high, this requirement to retransmit unnecessary packets for every lost packet leads to high flow completion times (FTC) (i.e., the time it takes for all data packets of a particular flow or message to be successfully transmitted and acknowledged).

Accordingly, the packet transmission acknowledgment process described below processing a plurality of packets transmitted from a first computing device to a second computing device. A packet sequence number (i.e., sequentially assigned numbers used to identify packets within a message) associated with each packet is identified. An error-detecting code representation (e.g., cyclic redundancy check (CRC), checksum, cryptographic hash functions, parity bits, etc.) is generated using the packet sequence number of each packet.

The error-detecting code representation is compared with an error-detecting code representation generated from a sequence of expected packet sequence numbers associated with transmission of a plurality of expected packets. For example, the error-detecting code representation generated from the sequence of expected packet sequence numbers associated with transmission the expected number of packets is a predefined value based on the number of packets stored in memory or other accessible storage location for a receiving computing device to compare against the received error-detecting code representation to determine if any packets are missing. In some implementations, the error-detecting code representation is CRC and is generated independently of the order in which the packets are received by the receiving node. Accordingly, implementations of the present disclosure track each of the packets in a message irrespective of the order of their arrival.

Using this comparison, a notification indicating that a packet is missing from the plurality of expected packets is generated when the error-detecting code representation is not equal to the error-detecting code representation generated from the sequence of expected packet sequence numbers. This notification can be used to request retransmission of the plurality of packets or the missing packet.

The details of one or more implementations are set forth in the accompanying drawings and the description below. Other features and advantages will become apparent from the description, the drawings, and the claims.

The Packet Transmission Acknowledgement Process:

Referring to FIGS. 1-5, packet transmission acknowledgment process 10 processes 100 a plurality of packets transmitted from a first computing device to a second computing device. A packet sequence number associated with each packet is identified 102. An error-detecting code representation is generated 104 using the packet sequence number of each packet. The error-detecting code representation is compared 106 with an error-detecting code representation generated from a sequence of expected packet sequence numbers associated with transmission of a plurality of expected packets. A notification indicating that a packet is missing from the plurality of expected packets is generated 108 when the error-detecting code representation is not equal to the error-detecting code representation generated from the sequence of expected packet sequence numbers.

In some implementations, packet transmission acknowledgment process 10 processes 100 a plurality of packets transmitted from a first computing device to a second computing device. For example, a packet is a unit of data that is transmitted over a network or other electronic connection between computing devices. A packet includes data being transmitted and control information. When a packet is transmitted from a first computing device to a second computing device, various rules (i.e., a protocol) define how the packet is processed and acknowledged by the receiving computing device. In some implementations, a message is transmitted between computing devices comprising a plurality of packets of a defined size. For example, for Ethernet connections, a packet ranges in size from 64 bytes to 1,518 bytes; for Internet Protocol connections, a packet has a maximum transmission unit of 65,535 bytes; for Transmission Control Protocol (TCP), a packet ranges from a few dozen bytes to a maximum segment size (e.g., 1,460 bytes for Ethernet connections). Accordingly, it will be appreciated that packets may vary in size depending upon the data being transmitted and/or the type of connection between computing devices.

In some implementations, the plurality of packets include a plurality of remote direct memory access (RDMA) packets. For example, RDMA packets are a type of data packet used in direct memory access from one computing device into the memory of another computing device without involving either computing device's operating systems. In some implementations, this enables high-speed data transfer with low latency and minimal central processing unit (CPU) overhead.

Referring also to FIG. 2, a first computing device (e.g., first computing device 200) and a second computing device (e.g., second computing device 202) are electronically coupled by a network (e.g., network 204). As discussed above, network 204 is an Ethernet connection. In another example, network 204 uses an IP connection. In yet another example, network 204 uses a TCP connection. In this example, first computing device 200 transmits a message (e.g., message 206) including a plurality of packets (e.g., packets 208, 210, 212, 214). As discussed above, packet transmission acknowledgment process 10 provides an error-detecting code-based approach for tracking the packet sequence within a message by calculating an error-detecting code representation on a received sequence of packets.

In some implementations, packet transmission acknowledgment process 10 identifies 102 a packet sequence number associated with each packet. For example, a message is defined as the communication of data between two computing devices, which includes one or more packets. Within each message, each packet is uniquely identified by a Packet Sequence Number in Message (mPSN). This number begins with "1" (or some other non-zero value) in the message's first packet and increments by one in each subsequent packet. Therefore, the sequence of packets in a complete message is indicated by a consecutive series of mPSNs, starting from "1" and continuing to the last mPSN. In combination with the Message Sequence Number (MSN) (i.e., the number of the message in a collection of messages), the mPSN distinctly identifies each packet. In some implementations, packet transmission acknowledgment process 10 identifies 102 the packet sequence number associated with each packet by reading at least a portion of data or metadata from the respective packet. Referring again to FIG. 2, packet transmission acknowledgment process 10 identifies 102 a packet sequence number associated with each packet. In one example, packet transmission acknowledgment process 10 identifies 102 packet sequence number 216 (i.e., "1") from packet 208, packet sequence number 218 (i.e., "2") from packet 210; packet sequence number 220 (i.e., "3") from packet 212; and packet sequence number 222 (i.e., "4") from packet 214. In another example and as will be discussed in greater detail below, suppose packet 212 is not received. In this example, packet transmission acknowledgment process 10 identifies 102 packet sequence number 216 (i.e., "1") from packet 208, packet sequence number 218 (i.e., "2") from packet 210; and packet sequence number 222 (i.e., "4") from packet 214.

In some implementations, packet transmission acknowledgment process 10 generates 104 an error-detecting code using the packet sequence number of each packet. An error-detecting code representation of a packet is a representation of a packet used to detect errors that may occur during transmission. In some implementations, generating 104 an error-detecting code representation includes appending extra bits to the packet sequence number. For example, generating 104 the error-detecting code representation includes generating a checksum of the packet sequence number.

In some implementations, the error-detecting code representation is cyclic redundancy check (CRC) generated on the packet sequence number. For example, packet transmission acknowledgment process 10 generates an error-detecting code representation of the packet by generating a cycle redundancy check (CRC) of the packet sequence number for a packet. CRC is an error-detecting code commonly used in digital networks and storage devices to detect accidental changes to digital data. Blocks of data entering these systems get a short check value attached, based on the remainder of a polynomial division of their contents. On retrieval, the calculation is repeated and, in the event the check values do not match, corrective action can be taken against data corruption. In some implementations, CRC ensures that every segment, and therefore the entire message, is accurately received by the receiver. Within this framework, a 'segment' denotes a subsection of the full message, which is sent in distinct packets from the sender to the receiver. Each segment constitutes a part of the overall data and is independently sent across the network.

In some implementations, generating 104 a CRC representation of a packet sequence number includes the following process: a codeword c in a binary (n,k) code is composed of k bits of information (data), succeeded by r (n−k=r) bits for error-checking signature (CRC). c(x) is a polynomial representation of the codeword c, with the i-th bit of the codeword being the coefficient of xi. The polynomial operations take place in Galois Field of size 2 (modulo 2). The code C is associated with a predetermined generator (primitive) polynomial g(x) of degree r that evenly divides all the codewords c(x) in code C.

Given a binary information message M of length m≤k, packet transmission acknowledgment process 10 computes corresponding r bits of CRC such that, when appended to M so the resulted polynomial is evenly divisible by g(x) (M∈C) as shown in Equations 1-2:

$$CRC[m(x)] = (x^r m(x)) \bmod g(x) \qquad (1)$$

$$c(x) = x^r m(x) - CRC[m(x)] \qquad (2)$$

The classical hardware implementation of CRC computation and verification uses a binary linear feedback shift register (LFSR) of length r, wired according to the coefficients of g(x). It takes m clock cycles to feed message m through the LFSR, after which the content of the LFSR are the r bits of CRC (CRC[m(x)]). Referring also to FIG. 3, packet transmission acknowledgment process 10 generates 104 error-detecting code representation 300 from packets 208, 210, 212, 214 using packet sequence numbers 216, 218, 220, 222 as described above.

In some implementations, generating 104 the error-detecting code representation includes generating 110 a CRC of each packet independent of an order of arrival of the plurality of packets using the packet sequence number of each packet. For example, the receiving computing device (e.g., second computing device 202) mirrors the sender computing device's (e.g., first computing device 200) procedure for processing CRC representations. Packet transmission acknowledgment process 10 gathers the packets that make up the message and calculates the CRC from the packet sequence numbers. As will be discussed in greater detail below, the resulting CRC (i.e., the CRC generated from the packet sequence numbers of the message) to verify its validity. However, in situations where packets may arrive out of order, this method necessitates significant memory to hold all the segments for in-order computation.

Conversely, an incremental computation method allows the receiving computing device (e.g., second computing device 202) to compute the CRC regardless of the order in which packets are received. In this example, each packet immediately contributes to the message's cumulative CRC as it arrives, obviating the need to wait for all packets to be received before starting the CRC computation. This not only conserves a significant amount of memory, but also reduces the time required for CRC generation and comparison.

In some implementations, packet transmission acknowledgment process 10 is able to generate the CRC for the plurality of packets independent of the order in which the packets are received using the packet sequence number of each packet. As a result, packet transmission acknowledgment process 10 facilitates tracking of the receipt of all packets in a message, irrespective of the order of their arrival. The advantage of this approach is that it stores the information about which packets have been received and which still require retransmission, in a compact CRC word, instead of larger bit vectors (as in conventional approaches), thereby offering a substantial improvement in resource efficiency. This approach stores a compact, fixed-size accumulated CRC (aCRC) signature, typically just tens of bits, in its respective context.

In some implementations, generating 104 the CRC of each packet independent of the order of arrival includes generating 110 the CRC for each packet separately; and generating 112 a combined CRC for the plurality of packets by combining the CRC from each packet using a bitwise exclusive-or operation. For example, when message packets are received in any order, the process of incrementally computing the CRC for the entire sequence of packets produces the same CRC result. This is done by calculating the CRC for each incoming packet's mPSN and then combining the results using a bitwise exclusive-or (XOR) operation to obtain the combined CRC for the entire sequence of mPSNs. In some implementations, generating 110 the CRC for each packet separately includes padding the CRC with a plurality of zeros based upon, at least in part, the packet sequence number for the respective packet. For example and referring also to FIG. 4, packet transmission acknowledgment process 10 generates 110 the CRC of each packet separately (e.g., by generating CRC 400 for packet 214; CRC 402 for packet 212; CRC 404 for packet 208; and CRC 406 for packet 210).

In this example, packet transmission acknowledgment process 10 generates 110 the CRC for each packet separately by padding the CRC with a plurality of zeros based upon, at least in part, the packet sequence number for the respective packet. As shown in FIG. 3, packet transmission acknowledgment process 10 determines that first-received packet (e.g., packet 214) is the fourth packet in the packet sequence and does not need to apply any padding. Packet transmission acknowledgment process 10 determines that the second-received packet (e.g., packet 212) is the third packet in the packet sequence and pads the packet sequence number with zeroes (e.g., zeroes 408) representative of one additional packet. Packet transmission acknowledgment process 10 determines that the third-received packet (e.g., packet 208) is the first packet in the expected sequence and pads the packet sequence number with zeroes (e.g., zeroes 410) representative of three additional packets. Finally, packet transmission acknowledgment process 10 determines that the finally received packet (e.g., packet 210) is the second packet in the expected sequence and pads the packet sequence number with zeroes (e.g., zeroes 412) representative of two additional packets. In this manner, packet transmission acknowledgment process 10 generates 112 the combined CRC (e.g., combined CRC 414) by combining the CRC from each packet using a bitwise XOR operation (e.g., combination operation 416). Accordingly, packet transmission acknowledgment process 10 is able to generate a CRC for the plurality of packets independent of the order in which the packets are received.

In some implementations, packet transmission acknowledgment process 10 compares 106 the error-detecting code representation with an error-detecting code representation generated from a sequence of expected packet sequence numbers associated with transmission of a plurality of expected packets. For example, packet transmission acknowledgment process 10 uses the message (e.g., message 206) to identify a corresponding error-detecting code representation generated from a sequence of expected packet sequence numbers associated with transmission of a plurality of expected packets. An error-detecting code representation generated from a sequence of expected packet sequence numbers associated with transmission of a plurality of expected packets is an expected error-detecting code representation that is predefined for message characteristics or properties (i.e., a number of expected packets, sequence of packets, etc.).

In some implementations, the error-detecting code representation generated from the sequence of expected packet sequence numbers is based upon, at least in part, a number of expected packets. For example, for a message (e.g., message 206) of "N" packets (with mPSN 1, 2, 3, . . . , N), packet transmission acknowledgment process 10 determines whether all N packets in the message have been received by comparing the sequence's CRC with an eCRC (e.g., the error-detecting code representation generated from the sequence of expected packet sequence numbers) expected for a message of N packets. For example, an error-detecting code representation generated from the sequence of expected packet sequence numbers (e.g., the "expected CRC") is generated and stored in a read-only memory that is set up initially after powering on the device. In one example, packet transmission acknowledgment process 10 generates and stores the expected CRC (eCRC) for the message packet sequence of maximal supported size (e.g., 1,024 packets per message, in one example) and stores filling CRC (fCRC) values for each mPSN ranging from mPSN=1 to 1,023 (maximally supported size minus one) on addresses 1 to 1,023 respectively, in this example. These fCRC values are aggregated by second computing device 202 to the accumulated CRC value (aCRC) as if all remaining packets in the message (i.e., all mPSNs greater than mPSN that caused entering the out-of-order state) have been successfully received. This way, the loss is localized to the initial out-of-order mPSN in the message and thus enhances the chance of resolving the lost packets.

Figure 5:
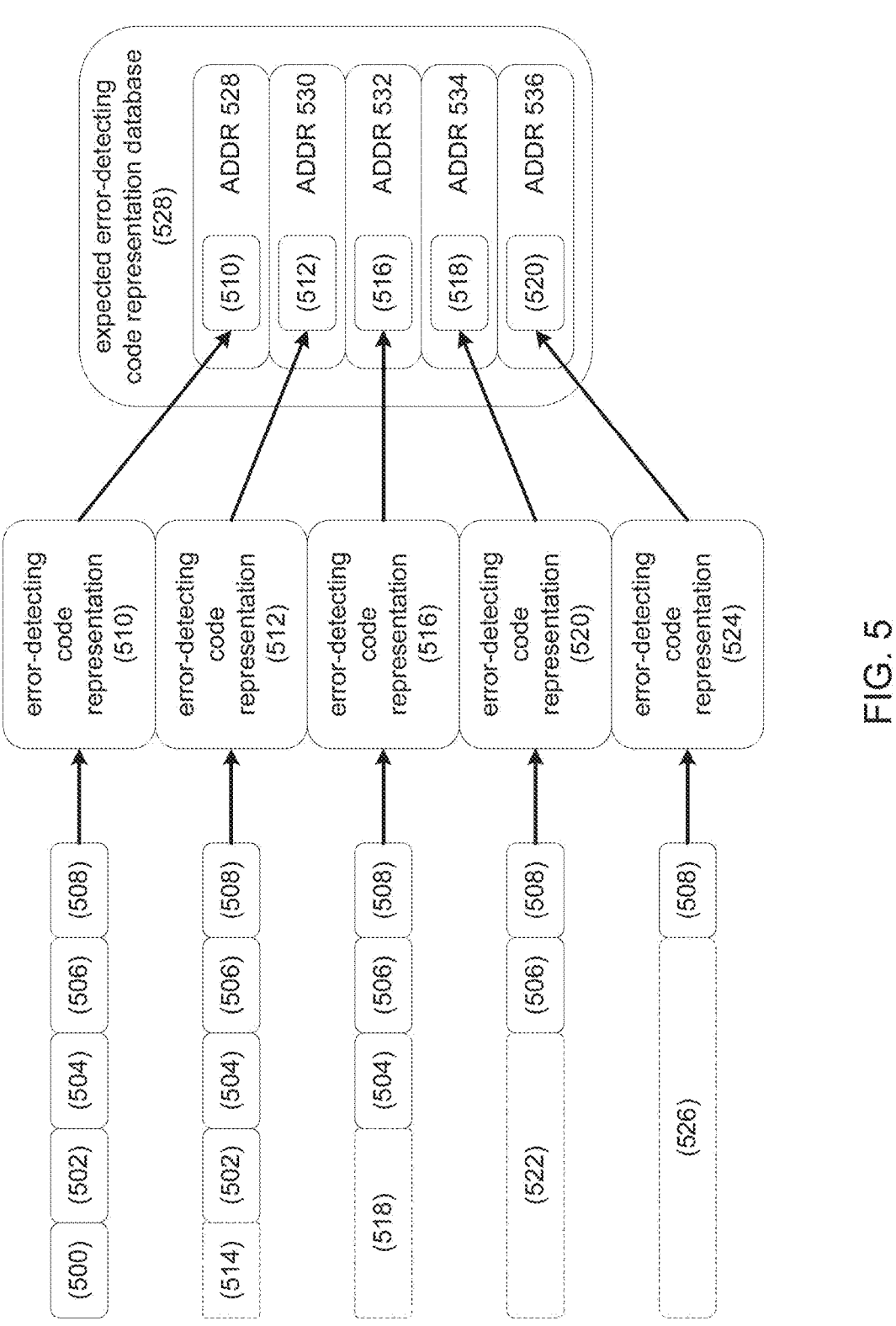
FIG. 5 is a diagrammatic view of the generating of an error-detecting code representation of a message independent of the order in which each packet is received when compared to an expected error-detecting code representation of the packets according to an implementation of the packet transmission acknowledgment process of FIG. 1.

Referring also to FIG. 3, packet transmission acknowledgment process 10 generates the plurality of error-detecting code representations generated for various sequences of expected packet sequence numbers. In this example, packet transmission acknowledgment process 10 generates a dataset of error-detecting code representation generated from the sequence of expected packet sequence numbers (e.g., expected error-detecting code representations 302, 304, 306, 308, 310) with each expected error-detecting code representation being generated as a function of the number of packets expected in a message. In the example of FIG. 5, suppose the message includes five packets (e.g., packets 500, 502, 504, 506, 508). In this example, packet transmission acknowledgment process 10 generates expected error-detecting code representation 510 for the combination of packets 500, 502, 504, 506, 508. Similarly, packet transmission acknowledgment process 10 generates expected error-detecting code representation 512 for the combination of packets 502, 504, 506, 508 where the first packet (e.g., packet 500) is missing and is replaced with zeroes (e.g., zeros 514).

Packet transmission acknowledgment process 10 generates expected error-detecting code representation 516 for the combination of packets 504, 506, 508 where the first and second packets (e.g., packets 500, 502) are missing and are replaced with zeroes (e.g., zeros 518). This is repeated for the remaining packet sequences by generating expected error-detecting code representation 520 for the combination of packets 506, 508 where the first, second, and third packets (e.g., packets 500, 502, 504) are missing and are replaced with zeroes (e.g., zeros 522); by generating expected error-detecting code representation 524 for packet 508 where the first, second, third, and fourth packets (e.g., packets 500, 502, 504, 506) are missing and are replaced with zeroes (e.g., zeros 526).

In some implementations, packet transmission acknowledgment process 10 generates expected error-detecting code representations for various combinations of missing packets. Packet transmission acknowledgment process 10 stores these expected error-detecting code representations in a unique memory address in an expected error-detecting code representation database (e.g., expected error-detecting code representation database 528). For example, packet transmission acknowledgment process 10 stores expected error-detecting code representation 510 at address 528, expected error-detecting code representation 512 at address 530; expected error-detecting code representation 516 at address 532; expected error-detecting code representation 518 at address 534; and expected error-detecting code representation 520 at address 536. Given its relatively small size and frequent usage (i.e., on a per-packet basis), expected error-detecting code representation database 528 may be an on-chip memory. However, it will be appreciated that expected error-detecting code representation database 528 may be stored locally within second computing device 202 and/or in a remote location accessible by second computing device 202. In some implementations and referring again to FIG. 3, packet transmission acknowledgment process 10 uses the number of packets (e.g., number of packets 302) to identify an expected error-detecting code representation for a message (e.g., message 206). For example, using number of packets 302, packet transmission acknowledgment process 10 identifies a corresponding expected error-detecting code representation from expected error-detecting code representation database 528. In this example, expected error-detecting code representation database 528 includes expected error-detecting code representations 304, 306, 308, 310, 312 where expected error-detecting code representation 304 is stored at address 314 which is associated with a first number of packets (e.g., "1"); expected error-detecting code representation 306 is stored at address 316 which is associated with a first number of packets (e.g., "1").

In some implementations, packet transmission acknowledgment process 10 compares 106 the error-detecting code representation generated from the plurality of received packets (e.g., error-detecting code representation 300) to the expected error-detecting code representation (e.g., expected error-detecting code representation 304) to generate an error-detecting code representation comparison 324. An error-detecting code representation comparison 324 is a metric of the similarity between error-detecting code representation 300 and expected error-detecting code representation 304 (or combined error-detecting code representation 314 as in FIG. 4). In one example, error-detecting code representation comparison 300 is binary (i.e., "equal" (e.g., equal result 326) or "not equal" (e.g., not equal result 328)). When error-detecting code representation comparison 324 is equal (e.g., equal result 326), this indicates that no packets are missing in the received message. However, when error-detecting code representation comparison 324 is not equal (e.g., not equal result 328), this indicates that one or more packets are missing in the received message.

In some implementations, packet transmission acknowledgment process 10 generates 108 a notification indicating that a packet is missing from the plurality of expected packets when the error-detecting code representation is not equal to the error-detecting code representation generated from the sequence of expected packet sequence numbers. For example, in response to determining that there is a difference in the error-detecting code representations (e.g., not equal result 328), packet transmission acknowledgment process 10 performs a remedial action to resolve the missing packet issue. In one example, packet transmission acknowledgment process 10 generates 108 a notification (e.g., notification 224) indicating that a packet is missing from the plurality of expected packets. For example, notification 224 may be provided to a user of second computing device 202 or an application that is processing message 206 indicating that at least some packets are missing.

In some implementations, generating 108 the notification indicating that a packet is missing from the plurality of expected packets includes sending 116 a request to the first computing device to retransmit at least one packet of the plurality of packets. For example, upon receiving notification 224, packet transmission acknowledgment process 10 sends 116 a request (e.g., request 226) to first computing device 200 to direct first computing device 200 to retransmit at least one packet. In some implementations, packet transmission acknowledgment process 10 identifies a missing packet (or an indication of a packet that is most likely missing).

Figure 6:
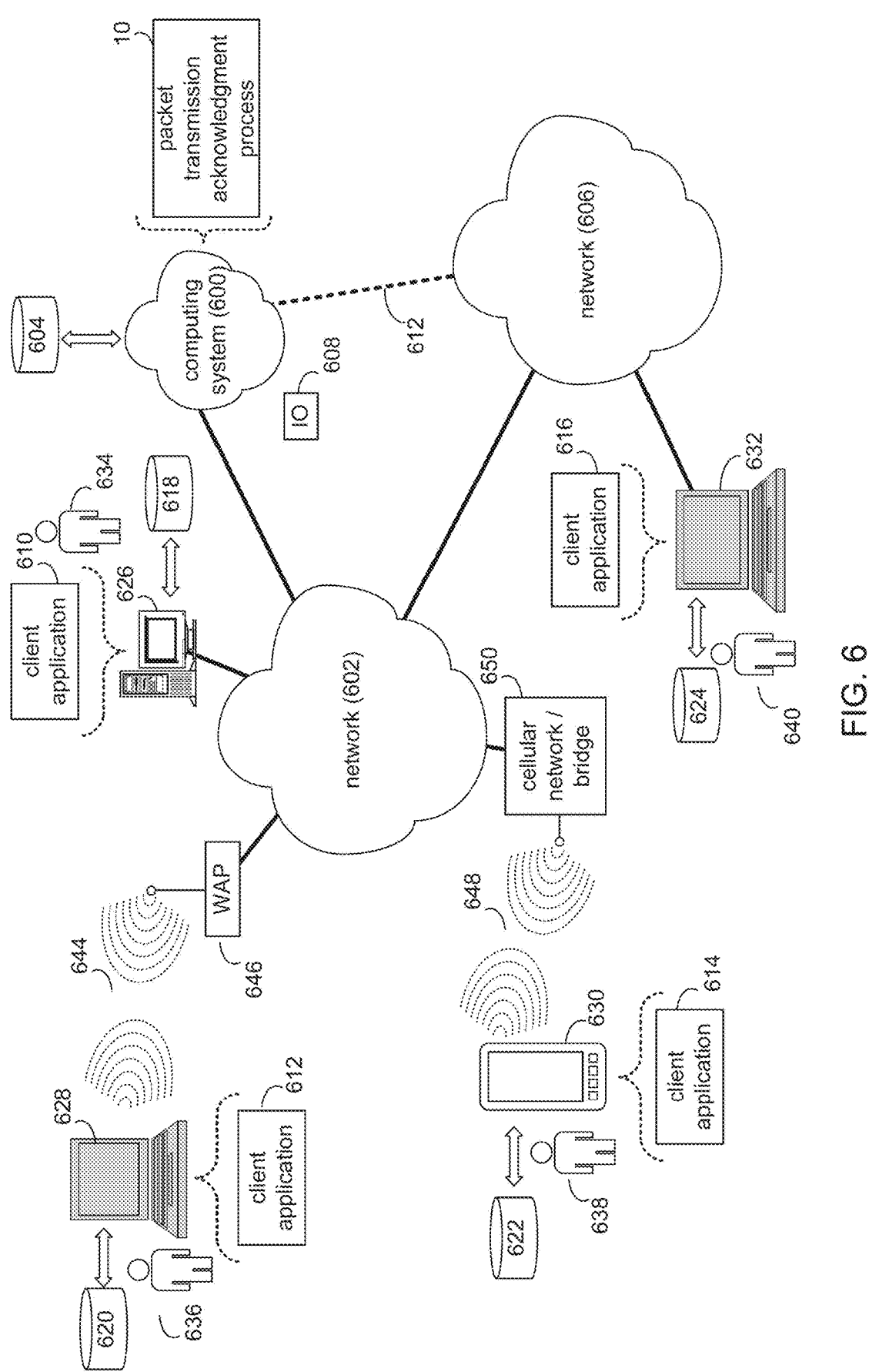
FIG. 6 is a diagrammatic view of computer system and the packet transmission acknowledgment process coupled to a distributed computing network. Like reference symbols in the various drawings indicate like elements.

System Overview:

Referring to FIG. 6, a packet transmission acknowledgment process 10 is shown to reside on and is executed by computing system 600, which is connected to network 602 (e.g., the Internet or a local area network). Examples of computing system 600 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of computing system 600 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of packet transmission acknowledgment process 10, which are stored on storage device 604 included within computing system 600, are executed by one or more processors (not shown) and one or more memory architectures (not shown) included within computing system 600. Storage device 604 may include: a hard disk drive; an optical drive; a RAID device; a random-access memory (RAM); a read-only memory (ROM); and all forms of flash memory storage devices. Additionally or alternatively, some portions of the instruction sets and subroutines of packet transmission acknowledgment process 10 are stored on storage devices (and/or executed by processors and memory architectures) that are external to computing system 600.

In some implementations, network 602 is connected to one or more secondary networks (e.g., network 606), examples of which include: a local area network; a wide area network; or an intranet.

Various input/output (IO) requests (e.g., IO request 608) are sent from client applications 610, 612, 614, 616 to computing system 600. Examples of IO request 608 include data write requests (e.g., a request that content be written to computing system 600) and data read requests (e.g., a request that content be read from computing system 600).

The instruction sets and subroutines of client applications 610, 612, 614, 616, which may be stored on storage devices 618, 620, 622, 624 (respectively) coupled to client electronic devices 626, 628, 630, 632 (respectively), may be executed by one or more processors (not shown) and one or more memory architectures (not shown) incorporated into client electronic devices 626, 628, 630, 632 (respectively). Storage devices 618, 620, 622, 624 may include: hard disk drives; tape drives; optical drives; RAID devices; random access memories (RAM); read-only memories (ROM), and all forms of flash memory storage devices. Examples of client electronic devices 626, 628, 630, 632 include personal computer 626, laptop computer 628, smartphone 630, laptop computer 632, a server (not shown), a data-enabled, and a dedicated network device (not shown). Client electronic devices 626, 628, 630, 632 each execute an operating system.

Users 634, 636, 638, 640 may access computing system 600 directly through network 602 or through secondary network 606. Further, computing system 600 may be connected to network 602 through secondary network 606, as illustrated with link line 642.

The various client electronic devices may be directly or indirectly coupled to network 602 (or network 606). For example, personal computer 626 is shown directly coupled to network 602 via a hardwired network connection. Further, laptop computer 632 is shown directly coupled to network 606 via a hardwired network connection. Laptop computer 628 is shown wirelessly coupled to network 602 via wireless communication channel 644 established between laptop computer 628 and wireless access point (e.g., WAP) 646, which is shown directly coupled to network 602. WAP 646 may be, for example, an IEEE 802.11a, 802.11b, 802.11g, 802.11n, Wi-Fi®, and/or Bluetooth® device that is capable of establishing a wireless communication channel 644 between laptop computer 628 and WAP 646. Smartphone 630 is shown wirelessly coupled to network 602 via wireless communication channel 648 established between smartphone 630 and cellular network/bridge 650, which is shown directly coupled to network 602.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this A, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

processing a plurality of packets transmitted from a first computing device to a second computing device;

identifying a packet sequence number associated with each packet;

generating an error-detecting code using the packet sequence number of each packet;

comparing the error-detecting code representation with an error-detecting code representation generated from a sequence of expected packet sequence numbers associated with transmission of a plurality of expected packets; and generating a notification indicating that a packet is missing from the plurality of expected packets when the error-detecting code representation is not equal to the error-detecting code representation generated from the sequence of expected packet sequence numbers.

2. The computer-implemented method of claim 1, wherein the error-detecting code representation is cyclic redundancy check (CRC).

3. The computer-implemented method of claim 2, wherein generating the error-detecting code representation includes generating a CRC of each packet independent of an order of arrival of the plurality of packets using the packet sequence number of each packet.

4. The computer-implemented method of claim 3, wherein generating the CRC of each packet independent of the order of arrival includes:

generating the CRC for each packet separately; and generating a combined CRC for the plurality of packets by combining the CRC from each packet using a bitwise exclusive-or operation.

5. The computer-implemented method of claim 1, wherein the plurality of packets include a plurality of remote direct memory access (RDMA) packets.

6. The computer-implemented method of claim 1, wherein the error-detecting code representation generated from the sequence of expected packet sequence numbers is based upon, at least in part, a number of expected packets.

7. The computer-implemented method of claim 1, wherein generating the notification indicating that a packet is missing from the plurality of expected packets includes sending a request to the first computing device to retransmit at least one packet of the plurality of packets.

8. A computing system comprising:
a memory; and
a processor configured to:
    process a plurality of packets transmitted from a first computing device to a second computing device;
    identify a packet sequence number associated with each packet;
    generate cyclic redundancy check (CRC) using the packet sequence number of each packet;
    compare the CRC with a CRC generated from a sequence of expected packet sequence numbers associated with transmission of a plurality of expected packets; and
    generate a notification indicating that a packet is missing from the plurality of expected packets.

9. The computing system of claim 8, wherein generating the error-detecting code representation includes generating a CRC of each packet independent of an order of arrival of the plurality of packets using the packet sequence number of each packet.

10. The computing system of claim 9, wherein generating the CRC of each packet independent of the order of arrival includes:
    generating the CRC for each packet separately; and
    generating a combined CRC for the plurality of packets by combining the CRC from each packet using a bitwise exclusive-or operation.

11. The computing system of claim 10, wherein generating the CRC for each packet separately includes padding the CRC with a plurality of zeros based upon, at least in part, the packet sequence number for the respective packet.

12. The computing system of claim 8, wherein the plurality of packets include a plurality of remote direct memory access (RDMA) packets.

13. The computing system of claim 8, wherein the error-detecting code representation generated from the sequence of expected packet sequence numbers is based upon, at least in part, a number of expected packets.

14. The computing system of claim 8, wherein generating the notification indicating that a packet is missing from the plurality of expected packets includes sending a request to the first computing device to retransmit at least one packet of the plurality of packets.

15. A computer program product residing on a non-transitory computer readable medium having a plurality of instructions stored thereon which, when executed by a processor, cause the processor to perform operations comprising:
    processing a plurality of remote direct memory access (RDMA) packets transmitted from a first computing device to a second computing device;
    identifying a packet sequence number associated with each packet;
    generating an error-detecting code representation using the packet sequence number of each packet;
    comparing the error-detecting code representation with an error-detecting code representation generated from a sequence of expected packet sequence numbers associated with transmission of a plurality of expected packets; and
    generating a notification indicating that a packet is missing from the plurality of expected packets.

16. The computer program product of claim 15, wherein the error-detecting code representation is cyclic redundancy check (CRC).

17. The computer program product of claim 16, wherein generating the error-detecting code representation includes generating a CRC of each packet independent of an order of arrival of the plurality of packets using the packet sequence number of each packet.

18. The computer program product of claim 17, wherein generating the CRC of each packet independent of the order of arrival includes:
    generating the CRC for each packet separately; and
    generating a combined CRC for the plurality of packets by combining the CRC from each packet using a bitwise exclusive-or operation.

19. The computer program product of claim 15, wherein the error-detecting code representation generated from the sequence of expected packet sequence numbers is based upon, at least in part, a number of expected packets.

20. The computer program product of claim 15, wherein generating the notification indicating that a packet is missing from the plurality of expected packets includes sending a request to the first computing device to retransmit at least one packet of the plurality of packets.

* * * * *